United States Patent [19]
Byers et al.

[11] 4,204,869
[45] May 27, 1980

[54] METHOD FOR FORMING NOBLE METAL SILVER PRECIPITATING NUCLEI

[75] Inventors: Charles H. Byers, Norfolk; Robert W. Hausslein, Lexington; Mara O. Nestle, Natick, all of Mass.

[73] Assignee: Polaroid Corporation, Cambridge, Mass.

[21] Appl. No.: 897,945

[22] Filed: Apr. 4, 1978

[51] Int. Cl.$^2$ .......................... G03C 1/48; C03C 17/06; C03C 21/00; C01G 55/00

[52] U.S. Cl. .................................... 430/564; 96/76 R; 106/1.13; 106/1.14; 106/1.15; 106/1.16; 106/1.21; 252/313 R; 423/22; 423/23; 423/42; 423/89; 423/92; 423/101; 423/140; 423/274; 428/539; 430/434

[58] Field of Search ............................ 96/76 R, 119 R; 428/539, 457; 423/22, 42, 43, 23, 101, 138, 99, 140, 92, 89, 274; 106/1.13, 1.14, 1.15, 1.16, 1.21; 252/313 R

[56] References Cited

U.S. PATENT DOCUMENTS

| | | | |
|---|---|---|---|
| 2,543,181 | 2/1951 | Land | 96/76 R |
| 2,726,154 | 12/1955 | Land | 96/76 R |
| 2,861,885 | 11/1958 | Land | 96/76 R |
| 2,944,894 | 7/1960 | Land | 96/76 R |
| 3,536,488 | 10/1970 | Land | 96/76 R |
| 3,615,426 | 10/1971 | Debruyn | 96/76 R |
| 3,615,427 | 10/1971 | Debruyn | 96/76 R |
| 3,615,428 | 10/1971 | Weed | 96/76 R |
| 3,615,429 | 10/1971 | Weed | 96/76 R |
| 3,647,440 | 3/1972 | Rasch | 96/76 R |
| 3,894,871 | 7/1975 | Land | 96/76 R |

OTHER PUBLICATIONS

Land, *One Step Photography*, Photographic Journal, Section A, 1/1950, pp. 7-15.

*Primary Examiner*—Richard L. Schilling
*Attorney, Agent, or Firm*—Philip G. Kiely

[57] ABSTRACT

Silver-precipitating nuclei are prepared by partially oxidizing a stannous salt reducing agent and then reducing a noble metal salt or complex with said reducing agent.

18 Claims, No Drawings

METHOD FOR FORMING NOBLE METAL SILVER PRECIPITATING NUCLEI

BACKGROUND OF THE INVENTION

Procedures for preparing photographic images in silver by diffusion transfer principles are well known in the art. For the formation of the positive silver images, a latent image contained in an exposed photosensitive silver halide emulsion is developed and almost concurrently therewith, a soluble silver complex is obtained by reaction of a silver halide solvent with the unexposed and undeveloped silver halide of said emulsion. Preferably, the photo-sensitive silver halide emulsion is developed with a processing composition in a viscous condition which is spread between the photosensitive element comprising the silver halide emulsion and a print-receiving element comprising, preferably, a suitable silver precipitating layer. The processing composition effects development of the latent image in the emulsion and, substantially contemporaneously therewith, forms a soluble silver complex, for example, a thiosulfate or thiocyanate, with undeveloped silver halide. This soluble silver complex is, at least in part, transported in the direction of the print-receiving element and the silver thereof is largely precipitated in the silver-precipitating element to form a positive image thereon. Procedures of this description are disclosed, for example, in U.S. Pat. No. 2,543,181 issued to Edwin H. Land. See, also, Edwin H. Land, *One Step Photography,* Photographic Journal, Section A, pp. 7-15, January 1950.

Additive color reproduction may be produced by exposing a photosensitive silver halide emulsion through an additive color screen having filter media or screen elements each of an individual additive color, such as red or green or blue, and by viewing the reversed or positive silver image formed by transfer to a transparent print-receiving element through the same or a similar screen which is suitably registered with the reversed positive image carried by the print-receiving layer.

As examples of suitable film structures for employment in additive color photography, mention may be made of U.S. Pat. Nos. 2,861,885; 2,726,154; 2,944,894; 3,536,488; 3,615,427; 3,615,428; 3,615,429; 3,615,426; and 3,894,871.

The image-receiving elements of the present invention are particularly suited for use in diffusion transfer film units wherein there is contained a positive transfer image and a negative silver image, the two images being in separate layers on a common, transparent support and viewed as a single, positive image. Such positive images may be referred to for convenience as "integral positive-negative images", and more particularly as "integral positive-negative transparencies." Examples of film units which provide such integral positive-negative transparencies are set forth, for example, in the above-indicated U.S. Pat. Nos. 3,536,488; 3,894,871; 3,615,426; 3,615,427; 3,615,428; and 3,615,429.

In general, silver-precipitating nuclei comprise a specific class of adjuncts well known in the art as adapted to effect catalytic reduction of solublilized silver halide specifically including heavy metals ahd heavy metal compounds such as the metals of Groups IB, IIB, IVA, VIA and VIII and the reaction products of Groups IB, IIB, IVA and VIII metals with elements of Group VIA.

Particularly preferred precipitating agents are noble metals such as silver, gold, platinum, palladium, etc., and are generally provided in a matrix as colloidal particles.

U.S. Pat. No. 3,647,440, issued Mar. 7, 1972 discloses receiving layers comprising finely divided non-silver noble metal nuclei obtained by reducing a noble metal salt in the presence of a colloid or binder material with a reducing agent having a standard potential more negative than −0.30. It is the thrust of the patent that a reducing agent having a standard potential more negative than −0.30 must be used in order to obtain nuclei of a specific, usable size range. It is further illustrated that stannous chloride, which does not fall within the standard potential range, does not produce useful nuclei. The binder materials disclosed include gelatin, polyvinyl pyrrolidone, polymeric latices such as copoly (2-chloroethylmethacrylate-acrylic acid), a mixture of polyvinyl alcohol and the interpolymer of n-butyl acrylate, 3-acryloyloxypropane-1-sulfonic acid, sodium salt and 2-acetoacetoxyethyl methacrylate, polyethylene latex, and colloidal silica. The amount of colloid binder employed ranges from about 5 to 500 mgs/ft$^2$ with the nuclei ranging from 1 to 200 micrograms/ft$^2$.

Copending application of Stanley M. Bloom and Boris Leny Ser. No. 649,201, filed Jan. 14, 1976, commonly assigned, abandoned, and now application Ser. No. 69,282, filed Aug. 24, 1979, discloses and claims a receiving element for use in an additive color photographic diffusion transfer film unit which comprises a transparent support carrying an additive color screen and a layer comprising noble metal silver-precipitating nuclei and a polymer; wherein the nuclei are present in a level of about 0.1–0.3 mgs/ft$^2$, and said polymer is present at a level of from about 0.5 to 5 times the coverage of said nuclei. Preferably, the noble metal is obtained by reduction of a noble metal salt or complex, and more preferably, the noble metal is palladium. The preferred binder polymers are gelatin and hydroxyethyl cellulose; gelatin at the low end of the nuclei-binder ratio can be employed to provide good density and neutral tone positive images in the receiving layer whereas the preferred levels of other polymers, such as hydroxyethyl cellulose, are at the higher portions of the nuclei-binder range.

Copending application Ser. No. 897,942, filed concurrently herewith, commonly assigned, discloses and claims a receiving element for use in a silver diffusion transfer film unit which comprises a support carrying a layer of noble metal silver-precipitating nuclei in a polymeric binder composition of polyvinyl alcohol and gelatin.

Copending application Ser. No. 897,943, filed concurrently herewith, commonly assigned, discloses and claims a receiving element for use in a silver diffusion transfer film unit which comprises a support carrying a layer of noble metal silver-precipitating nuclei in a binder composition of hydroxyethyl cellulose and gelatin.

The above-mentioned patents and applications are incorporated herein by reference in their entirety.

SUMMARY OF THE INVENTION

The present invention is directed to a method of forming noble metal silver-precipitating nuclei and to image-receiving elements and film units employing such nuclei. The noble metal silver-precipitating nuclei are prepared by the reduction of a noble metal salt or complex by a stannous salt wherein said stannous salt is partially oxidized prior to said reduction.

The noble metal silver-precipitating nuclei are particularly suitable for use in the receiving elements and film units disclosed in copending application Ser. Nos. 897,942 and 897,943.

DETAILED DESCRIPTION OF THE INVENTION

The novel method of the present invention comprises the steps of forming an aqueous solution of a stannous salt reducing agent, contacting said solution with an oxidizing agent to partially oxidize the stannous ion and then adding a noble metal salt or complex, preferably in solution, to said solution of reducing agent, whereby noble metal nuclei are formed. The nuclei may then be incorporated into receiving elements and film units as taught in the above cross-referenced patents and applications.

It has been found that positive silver images formed in silver-precipitating layers of the present invention possess enhanced densities, particularly in additive color film units. Thus, if the reduction of the noble metal salt or complex is carried out without any oxidation of the reducing agent, i.e. under a nitrogen blanket, the resulting positive image densities could be poor. Similarly, if total oxidation of the $Sn^{+2}$ to $Sn^{+4}$ is carried out, reduction of the noble metal salt does not occur. Still further, it is believed that oxidation must be uniformly applied to the reducing agent solution. Thus, if a portion of the reducing agent is oxidized completely and then added to the remainder of the reducing agent solution which has not been treated with oxidizing agent the benefits would not accrue to the resulting nuclei. Therefore, it is believed the mechanism is not entirely known and that some reaction in addition to oxidation may be occurring.

In a particularly preferred embodiment, the solution preparation prior to the addition of the stannous salt is maintained under a blanket of nitrogen, as is the addition of the noble metal salt or complex, with the oxidizing agent being present only in the stannous salt solution prior to the addition of the noble metal salt.

The preferred oxidizing agents are oxygen and its compounds, introduced into the reducing agent solution as air, hydrogen peroxide or, preferably pure gaseous oxygen. If air or oxygen is employed, it is by sparging, i.e., bubbling the gas through the solution. If hydrogen peroxide is employed, it is added to the reducing agent solution as a solution.

The oxidizing agent is preferably in contact with the reducing agent solution for approximately the time period required to obtain the optimum sensitometric effect from nuclei produced thereby. For example, in the case of stannous chloride, a preferred reducing agent, the time of contact with oxygen is about 5–30 minutes. The use of air, which is only about 20% oxygen, will require a more lengthy contact time. Excessive treatment with the oxidizing agent will result in decreased reducing agent activity and concomitant diminished densities in the positive silver image obtained from nuclei so formed.

It is preferable that the $Sn^{+4}/Sn^{+2}$ mole ratio obtained by oxidation range between about 2.5 to 10 and 5.5 to 10; a 3 to 10 ratio is particularly preferable.

The aqueous solution of reducing agent generally contains a polymer binder. Suitable polymers include:

gelatin
methyl cellulose
sodium salt of carboxymethyl cellulose
hydroxymethyl cellulose
hydroxyethyl cellulose
hydroxypropyl cellulose
carboxymethyl hydroxyethyl cellulose
alginic acid, sodium salt
agarose
polyvinyl alcohol
deacetylated chitin Particularly preferred is gelatin. Subsequent to nuclei formation additional polymer such as polyvinyl alcohol or hydroxyethyl cellulose may be added in the manner taught by applications Ser. Nos. 897,942 and 897,943.

The noble metals employed in the present invention include silver, gold, palladium and platinum. Palladium is particularly preferred. Suitable noble metal compounds include:

$K_2PdCl_4$
$PdCl_2$
$H_2PtCl_6$
$AgNO_3$
$HAuCl_4$

The following examples illustrate the novel preparation of silver-precipitating nuclei within the scope of the present invention.

EXAMPLE A

The following solution was prepared:

3.47 g glacial acetic acid
3140 water
3.6 g 20% gelatin solution

The thus formed solution was heated to 80° C. and then 1.66 g of $SnCl_2.2H_2O$ was added with stirring and 8 minutes was allowed for dissolution of the stannous chloride. To the stannous chloride reducing solution was added 330 g of $PdCl_2$ solution (1400 cc $H_2O$ and 28 g of a solution which contains 80.6 g HCl and 166 g $PdCl_2$/1 of solution) with agitation. As a coating aid, a 0.1% alkyl phenoxypolyoxyethylene ethanol sufactant (sold under the trade name PE120 by NOPCO Chem. Div. of Diamond Shamrock Company) was added.

The following example sets forth an additive color diffusion transfer film unit in which the utility of the nuclei of the present invention was determined.

EXAMPLE B

A film unit was prepared comprising a transparent polyester film base carrying on one surface, an additive color screen of approximately 1500 triplets per inch of red, blue and green filter screen elements in repetitive side-by-side relationship; 328 mgs/ft$^2$ polyvinylidine chloride/polyvinyl formal protective overcoat layer; a nucleating layer comprising 0.15 mgs/ft$^2$ palladium nuclei and 0.2 mgs/ft$^2$ gelatin; an interlayer formed by coating 1.9 mgs/ft$^2$ gelatin, 2.3 mgs/ft$^2$ acetic acid and 0.19 mgs/ft$^2$ octylphenoxy polyethoxy ethanol surfactant; a hardened gelatino silver iodobromo emulsion (0.59$\mu$ mean diameter grains) coated at a coverage of about 91 mgs/ft$^2$ of gelatin and about 150 mgs/ft$^2$ of silver with about 7.18 mgs/ft$^2$ propylene glycol alginate and about 0.73 mgs/ft$^2$ of nonyl phenol polyglycol ether (containing 9.5 modes of ethylene oxide) panchromatically sensitized with 5.5'-dimethyl-9-ethyl-3,3'-bis-(3 sulfopropyl) thiacarbocyanine triethylammonium salt (0.53 mg/g Ag); 5,5'-diphenyl-9-ethyl-3,3'-bis-(4-sulfobutyl oxacarbocyanine (0.75 mg/gAg); anhydro-5.6-dichloro-1,3-diethyl-3'-(4"-sulfobutyl)-benzimidazolo-thiacarbocyanine hydroxide (0.7 mg/gAg); and 3-(3-sulfopropyl)-3'-ethyl-4,5-benzothia-thiacyanine betaine (1.0 mg/gAg); red, green, green and blue sensitizers respectively; and the following antihalo top coat.

| Top Coat | mgs/ft² |
|---|---|
| Gelatin | 400 |
| Dow 620 (carboxylated styrene/butadiene copolymer latex Dow Chemical Co., Midland, Michigan) | 204 |
| Propylene glycol alginate | 25.7 |
| Dioctyl ester of sodium sulfosuccinate | 1.2 |
| Benzimidazole-2-thiol gold $Au^{+1}$ complex | 5 (as gold) |
| Daxad-11 (polymerized sodium salts of alkyl naphthalene sulfonic acid) Manufactured by W. R. Grace & Co. Cambridge, MA | 0.38 |
| Pyridinium bis-1,5 (1,3-diethyl-2-thiol-5-barbituric acid) pentamethine oxanol | 5.6 |
| 4-(2-chloro-4-dimethylamino benzaldehyde)-1-(p-phenyl carboxylic acid)-3-methyl pyrazolone-5 | 7 |

| Processing Composition | Weight % |
|---|---|
| Sodium hydroxide | 9.4 |
| hydroxyethyl cellulose (sold by Hercules, Inc., Wilmington, Delaware under the tradename Natrosol 250HH) | 0.7 |
| Tetramethyl reductic acid | 9.0 |
| Potassium bromide | 0.6 |
| Sodium sulfite | 0.8 |
| 2-methylthiomethyl-4,6-dihydroxypyrimidine | 9.0 |
| 4-aminopyrazolo-[3,4d]-pyrimidine | 0.02 |
| N-benzyl-α-picolinium bromide (50% solution) | 2.9 |
| Water | 67.6 |

In addition, the processing composition contained 3.3% by weight of sodium tetraborate 0.10 $H_2O$.

Film units prepared according to the above procedure were given a 16 mcs exposure with a Xenon sensitometer and processed with mechanical rollers with an 8 mil gap disposing the processing composition between the top coat and a polyethylene terephthalate cover sheet. The film unit was held in the dark for 1 minute and then the cover sheet was removed, retaining the rest of the film unit together and then air drying. The spectral data was obtained by reading the neutral column to red, green and blue light in an automatically recording densitometer.

EXAMPLE 1 (Control)

Nuclei were produced according to the procedure of Example A wherein the solutions were sparged with nitrogen during the entire procedure. Nuclei were then incorporated into a film unit as described in Example B which was then exposed and processed. The following spectral data was obtained:

| $D_{max}$ (Average of 2 runs) | | |
|---|---|---|
| Red | Green | Blue |
| 2.28 | 2.53 | 2.23 |

EXAMPLE 2 (Control)

The procedure of Example 1 was repeated, except that the nuclei-forming solutions were blanketed with nitrogen.

| $D_{max}$ (Average of 2 runs) | | |
|---|---|---|
| Red | Green | Blue |
| 2.65 | 2.81 | 2.67 |

EXAMPLES 3-7 (Air sparging)

The procedure of Example A was modified in the manner described below. The nuclei were incorporated into film units as described in Example B which were then exposed and processed.

| EX. | PROCEDURE MODIFICATION | $D_{MAX}$ RED | GREEN | BLUE |
|---|---|---|---|---|
| 3 | Air sparged throughout entire procedure | 2.59 | 2.89 | 2.72 |
| 4 | Air sparged for 8 min. after $SnCl_2$ addition but before $PdCl_2$ addition | 2.86 | 3.01 | 2.92 |
| 5 | Air sparged for 16 min. after $SnCl_2$ addition but before $PdCl_2$ addition | 2.84 | 2.98 | 2.88 |
| 6 | Air sparged entire procedure until $PdCl_2$ addition | 2.86 | 3.01 | 2.92 |
| 7 | Air sparged for 30 min. after $SnCl_2$ addition but before $PdCl_2$ addition | 2.82 (Average of 4 runs) | 3.00 | 2.89 |

EXAMPLES 8-14 (Oxygen Sparging)

The procedure of Example A was modified in the manner described below. The nuclei were incorporated into film units as described in Example B which were then exposed and processed.

| EX. | PROCEDURE MODIFICATION | $D_{MAX}$ RED | GREEN | BLUE |
|---|---|---|---|---|
| 8 | Nitrogen blanketed throughout except oxygen sparged for 8 min. after $SnCl_2$ addition | 3.07 (Average of 6 runs) | 3.16 | 3.00 |
| 9 | Nitrogen sparged until $SnCl_2$ addition then oxygen sparged for 8 min. after $SnCl_2$ addition | 3.24 | 3.26 | 3.03 |
| 10 | Oxygen sparged for 4 min. after $SnCl_2$ addition | 3.16 | 3.26 | 3.12 |
| 11 | Solution sparged with oxygen until $SnCl_2$ addition then blanketed with nitrogen | 2.99 | 3.08 | 2.90 |
| 12 | Oxygen sparged for 8 min. after $SnCl_2$ addition then nitrogen blanketed for 30 min. before $PdCl_2$ addition | 3.28 | 3.32 | 3.16 |
| 13 | Oxygen sparged for 8 min. after $SnCl_2$ addition then nitrogen sparged for 5 min. before $PdCl_2$ addition | 2.90 | 2.95 | 2.80 |
| 14 | Oxygen sparged after $PdCl_2$ addition | 2.16 | 2.46 | 2.60 |

EXAMPLES 15-17 ($Sn^{+2}$ deactivation)

In the following Examples the indicated portions of $SnCl_2$ were oxygen-sparged for a time sufficient to deactivate it, i.e., converted to $Sn^{+4}$ which will not reduce $PdCl_2$. The deactivated portion was then nitrogen sparged and added to the acetic acid-gelatin solution with the remainder of the $SnCl_2$ and the procedure of Example A followed under a nitrogen blanket. The nuclei were incorporated into film units as described in Example B which were then exposed and processed.

| EX. | PROCEDURE MODIFICATION | $D_{MAX}$ RED | GREEN | BLUE |
|---|---|---|---|---|
| 15 | 10% $SnCl_2$ deactivated | 2.60 | 2.78 | 2.61 |
| 16 | 20% $SnCl_2$ deactivated | 2.56 | 2.85 | 2.74 |
| 17 | 30% $SnCl_2$ deactivated | 2.78 | 2.97 | 2.89 |

EXAMPLES 18-24

The following series of Examples demonstrate that the presence of oxygen in the solution is critical during the $SnCl_2$ phase rather than at the time of addition of the $PdCl_2$. The nuclei were incorporated into film units as described in Example B which were then exposed and processed.

| EX. | PROCEDURE MODIFICATION | $D_{MAX}$ RED | GREEN | BLUE |
|---|---|---|---|---|
| 18 | Oxygen sparged after $PdCl_2$ addition | 2.16 | 2.46 | 2.60 |
| 19 | Oxygen sparged for 8 min. after $SnCl_2$ addition then nitrogen blanketed after $PdCl_2$ addition | 3.18 | 3.30 | 3.10 |
| 20 | Nitrogen sparged until $SnCl_2$ addition, oxygen sparged for 8 min. after $SnCl_2$ addition then nitrogen blanketed after $PdCl_2$ addition | 3.32 | 3.23 | 3.10 |
| 21 | Nitrogen sparged until $SnCl_2$ addition, oxygen sparged for 8 min. after $SnCl_2$ addition, nitrogen sparged for 5 min. then $PdCl_2$ added and nitrogen blanketed | 3.27 | 3.18 | 3.08 |
| 22 | Nitrogen sparged until $SnCl_2$ addition, oxygen sparged for 8 min. after $SnCl_2$ addition, then nitrogen sparged for 5 min., nitrogen blanketed for 15 min. then $PdCl_2$ added and nitrogen blanketed | 3.33 | 3.25 | 3.10 |
| 23 | Same procedure as Example 22 except that the solution was nitrogen blanketed for 45 min. prior to $PdCl_2$ addition | 3.20 | 3.20 | 3.07 |
| 24 | Same procedure as Example 22 except that the solution was nitrogen blanketed 2 hours prior to $PdCl_2$ addition | 2.97 | 2.95 | 2.82 |

EXAMPLES 25-28 (Hydrogen peroxide)

The procedure of Example A was modified as described below. The nuclei were incorporated into film units as described in Example B which were then exposed and processed.

| EX. | PROCEDURE MODIFICATION | $D_{MAX}$ RED | GREEN | D |
|---|---|---|---|---|
| 25 | Solution nitrogen sparged until $SnCl_2$ added. Then 20 mole % hydrogen peroxide (3% aqueous solution) (base on weight of $SnCl_2$) was added, the solution nitrogen blanketed and stirred for 8 min., $PdCl_2$ was then added and nitrogen blanketed | 2.55 | 2.72 | 2.60 |
| 26 | Same procedure as Example 25 except that 40 mole % hydrogen peroxide was used | 2.61 | 2.82 | 2.60 |
| 27 | Same procedure as Example 25 except that 30 mole % hydrogen peroxide was used | 2.81 | 2.83 | 2.90 |
| 28 | Same procedure as Example 25 except that subsequent to reduction of the $PdCl_2$ an additional 20 mole % hydrogen peroxide was added. | 3.00 | 3.00 | 2.90 |

From the foregoing it can be seen that a variety of oxidizing agents can be employed and that film units employing thus-formed nuclei show improved densities over prior art nuclei. It is only critical that the reducing agent be partially oxidized. The presence of oxygen is not necessary at the time $PdCl_2$ is added and thus it is preferred that oxygen not be present after $PdCl_2$ addition. In a particularly preferred embodiment, except for the presence of the oxidizing agent after reducing agent addition, the nuclei preparation is carried out under a nitrogen blanket.

While the invention was described previously in terms of an additive color system, it should be understood that the noble metal nuclei prepared according to the procedure of the present invention are also suitable for use in black and white silver diffusion transfer systems.

The support employed in the present invention is not critical. The support of film base employed may comprise any of the various types of transparent rigid or flexible supports, for example, glass, polymeric films of both the synthetic type and those derived from naturally occurring products, etc. Especially suitable materials, however, comprise flexible transparent synthetic polymers such as polymethacrylic acid, methyl and ethyl esters; vinyl chloride polymers; polyvinyl acetals; polyamides such as nylon; polyesters such as the polymeric films derived from ethylene glycol terephthalic acid; polymer cellulose derivatives such as cellulose acetate, triacetate, nitrate, propionate, butyrate, acetate-butyrate; or acetate propionate; polycarbonates; polystyrenes; and the like.

The additive color screen employed in the present invention may be formed by techniques well known in the art, e.g., by sequentially printing the requisite filter patterns by photomechanical methods. An additive color screen comprises an array of sets of colored areas or filter elements, usually from two to four different colors, each of said sets of colored areas being capable of transmitting visible light within a predetermined wavelength range. In the most common situations the additive color screen is trichromatic and each set of color filter elements transmits light within one of the so-called primary wavelength ranges, i.e., red, green and blue. The additive color screen may be composed of minute dyed particles, such as starch grains or hardened gelatin particles, intermixed and interspersed in a regular or random arrangement to provide a mosaic. A regular mosaic of this type may be made by the alternating embossing and doctoring technique described in U.S. Pat. No. 3,019,124. Another method of forming a suitable color screen comprises multi-line extrusion of the type disclosed in U.S. Pat. No. 3,032,008, the colored lines being deposited side-by-side in a single coating operation. Still another method is set forth in U.S. Pat. No. 3,284,208. Silver halide solvents useful in forming the desired soluble complex with unexposed silver are well known and, for example, may be selected from the alkali metal thiosulfates, particularly sodium or potassium thiosulfates, or the silver halide solvent may be cyclic imide, such as uracil, in combination with a nitrogenous base as taught in U.S. Pat. No. 2,857,274 issued Oct. 21, 1958, to Edwin H. Land or pseudouracils, such as the 4,6-dihydroxy-pyrimidines. While the silver halide solvent is preferably initially present in the processing composition, it is within this invention to initially position the silver halide solvent in a layer of the film unit, preferably in the form of a precursor which releases or generates the silver halide solvent upon contact with an alkaline processing fluid.

The processing composition may contain a thickening agent, such as an alkali metal carboxymethyl cellulose or hydroxyethyl cellulose, in a quantity and viscosity grade adapted to facilitate application of the processing composition. The processing composition may be left on the processed film or removed, in accordance with known techniques, as is most appropriate for the particular film use. The requisite alkalinity, e.g., a pH of 12–14, is preferably imparted to the processing composition, such as sodium, potassium and/or lithium hydroxide. A wetting agent may be advantageously included in the processing composition to facilitate application thereof, particularly where the processing composition is applied in a very thin layer of low viscosity fluid.

Suitable silver halide developing agents may be selected from amongst those known in the art, and may be initially positioned in a layer of the photosensitive element and/or in the processing composition. Organic silver halide developing agents are generally used, e.g., organic compounds of the benzene or naphthalene series containing hydroxyl and/or amino groups in the para- or ortho-positions with respect to each other, such as hydroquinone, tert-butyl hydroquinone, toluhydroquinone, p-aminophenol, 2,6-dimethyl-4-aminophenol, 2,4,6-triaminophenol, etc. If the additive color transparency is one which is not washed after processing to remove unused silver halide developing agent, development reaction products, etc., the silver halide developing agent(s) should not give rise to colored reaction products which might stain the image or which, either unreacted or reacted, might adversely affect the stability and sensitometric properties of the final image. Particularly useful silver halide developing agents having good stability in alkaline solution are substituted reductic acids, particularly tetramethyl reductic acid, as disclosed in U.S. Pat. No. 3,615,440 issued Oct. 26, 1971 to Stanley M. Bloom and Richard D. Cramer, and α, β-enediols as disclosed in U.S. Pat. No. 3,730,716 issued to Edwin H. Land, Stanley M. Bloom and Leonard C. Farney on May 1, 1973.

What is claimed is:

1. A method for forming noble metal silver-precipitating nuclei which comprises the steps of
(a) forming an aqueous solution of a stannous salt;
(b) contacting said solution with an oxidizing agent to partially oxidize said stannous ion to provide a ratio of $Sn^{+4}$ to $Sn^{+2}$ of about 2.5 to 10 to 5.5 to 10; and
(c) adding a noble metal salt or complex.

2. The method of claim 1 wherein said aqueous solution includes a polymer.

3. The method of claim 2 wherein said polymer is gelatin.

4. The method of claim 3 wherein a second polymer is added subsequent to nuclei formation.

5. The method of claim 4 wherein said second polymer is hydroxyethyl cellulose.

6. The method of claim 4 wherein said second polymer is polyvinyl alcohol.

7. The method of claim 1 wherein said aqueous solution includes acetic acid.

8. The method of claim 1 which includes the step of coating said nuclei on a support.

9. The method of claim 1 wherein said stannous salt is stannous chloride.

10. The method of claim 1 wherein said noble metal is palladium.

11. The method of claim 1 wherein said oxidizing agent is oxygen.

12. The method of claim 1 wherein said oxidizing agent is air.

13. The method of claim 1 wherein said oxidizing agent is hydrogen peroxide.

14. The method of claim 1 wherein said steps are carried out under a blanket of nitrogen except for the step of oxidizing said stannous ion.

15. The method of claim 1 wherein said aqueous solution is nitrogen sparged prior to contacting said solution with an oxidizing agent.

16. The method of claim 1 wherein said ratio is 3 $Sn^{+4}$ to 10 $Sn^{+2}$.

17. A method for forming noble metal silver-precipitating element which comprises the steps of
(a) forming an aqueous solution of acetic acid and gelatin;
(b) adding to said solution stannous chloride;
(c) sparging said solution with oxygen to provide a ratio of 3:10 $Sn^{+4}$:$Sn^{+2}$;
(d) adding palladous chloride to said solution; and
(e) coating the thus-formed nuclei on a support.

18. A method for forming noble metal silver-precipitating nuclei which comprises the steps of
(a) forming an aqueous solution of a stannous salt;
(b) contacting said solution with an oxidizing agent to partially oxidize said stannous ion; and
(c) adding a noble metal salt or complex under a nitrogen blanket.

* * * * *